United States Patent
Su et al.

(10) Patent No.: US 12,186,803 B2
(45) Date of Patent: Jan. 7, 2025

(54) NICKEL-BASED SUPERALLOY FORMED BY SELECTIVE LASER MELTING AND PREPARATION METHOD THEREOF

(71) Applicant: Northwestern Polytechnical University, Xi'an Shaanxi (CN)

(72) Inventors: Haijun Su, Xi'an Shaanxi (CN); Yong Zhao, Xi'an Shaanxi (CN); Meng Wang, Xi'an Shaanxi (CN); Jun Zhang, Xi'an Shaanxi (CN); Min Guo, Xi'an Shaanxi (CN); Lin Liu, Xi'an Shaanxi (CN); Hengzhi Fu, Xi'an Shaanxi (CN)

(73) Assignee: Northwestern Polytechnical University, Xi'an Shannxi (CN)

( * ) Notice: Subject to any disclaimer, the term of this patent is extended or adjusted under 35 U.S.C. 154(b) by 242 days.

(21) Appl. No.: 17/685,824

(22) Filed: Mar. 3, 2022

(65) Prior Publication Data
US 2024/0189897 A1   Jun. 13, 2024

(30) Foreign Application Priority Data
Mar. 3, 2021   (CN) .......................... 202110235894.2

(51) Int. Cl.
*B22F 1/05*   (2022.01)
*B22F 1/142*   (2022.01)
(Continued)

(52) U.S. Cl.
CPC ................ *B22F 1/05* (2022.01); *B22F 1/142* (2022.01); *B22F 3/1007* (2013.01); *B22F 3/105* (2013.01);
(Continued)

(58) Field of Classification Search
CPC .......................... B22F 1/05–056; C22C 19/057
See application file for complete search history.

(56) References Cited

U.S. PATENT DOCUMENTS

| | | | | |
|---|---|---|---|---|
| 2014/0295087 A1* | 10/2014 | Rickenbacher | ........... | B22F 3/15 427/404 |
| 2016/0273079 A1* | 9/2016 | Das | ........... | B33Y 10/00 |

(Continued)

FOREIGN PATENT DOCUMENTS

| | | | |
|---|---|---|---|
| CN | 104846254 | | 8/2015 |
| CN | 104846254 A | * | 8/2015 |

(Continued)

OTHER PUBLICATIONS

Ho I-T., et al.; Microstructural evolution induced by inoculants during the selective laser melting of IN718; J. of Additive Manufacturing; vol. 21; 2018, p. 465-471 (Year: 2018).*

(Continued)

*Primary Examiner* — Alexandra M Moore
*Assistant Examiner* — Austin Pollock
(74) *Attorney, Agent, or Firm* — RAY QUINNEY & NEBEKER P.C.; Paul N. Taylor

(57) ABSTRACT

Disclosed are a nickel-based superalloy formed by selective laser melting and a preparation method thereof. In the method, CrFeNb alloy powder is used as a grain refiner, and its element composition is within the composition range of a nickel-based superalloy powder to ensure that the prepared nickel-based superalloy has the same element composition with the original alloy; the grain size in the nickel-based superalloy could be refined by the addition of CrFeNb alloy powder, such that the anisotropic columnar grain structure in the alloy is transformed to equiaxed grain structure, thereby improving mechanical properties of the alloy.

5 Claims, 6 Drawing Sheets

(51) Int. Cl.
    B22F 3/10      (2006.01)
    B22F 3/105     (2006.01)
    B22F 9/04      (2006.01)
    C22C 19/05     (2006.01)
(52) U.S. Cl.
    CPC ...... *C22C 19/057* (2013.01); *B22F 2009/043* (2013.01); *B22F 2201/11* (2013.01); *B22F 2301/155* (2013.01); *B22F 2304/10* (2013.01)

(56) References Cited

U.S. PATENT DOCUMENTS

| | | | | |
|---|---|---|---|---|
| 2018/0161874 | A1* | 6/2018 | Nuechterlein | ........ C01B 32/956 |
| 2021/0246530 | A1* | 8/2021 | Chang | ...................... C22C 1/06 |
| 2024/0060156 | A1* | 2/2024 | Liu | ...................... B33Y 40/10 |

FOREIGN PATENT DOCUMENTS

| | | | | |
|---|---|---|---|---|
| CN | 106180719 | | 12/2016 | |
| CN | 110899698 | | 3/2020 | |
| WO | WO-2020041726 | A1 * | 2/2020 | .............. B22F 10/10 |

OTHER PUBLICATIONS

Carpenter Additive; "PowderRange 718", https://web.archive.org/web/20210116081610/https://f.hubspotusercontent10.net/hubfs/6205315/Resources/Data%20Sheets/20201112-CT-PowderRange-718-AM-DataSheet_Revs.pdf, retrieved on Apr. 2, 2024; wayback date Jan. 16, 2021 (Year: 2021).*

Chang Y., et al.; "Effects of CoAl2O4 inoculants on microstructure and mechanical properties of IN718 processed by selective laser melting"; J. of Additive Manufacturing; 35; 2020, (Year: 2020).*

Yang W., et al.; "Nucleation Crystallography of Ni Grains on CrFeNb Inoculants Investigated by Edge-to-Edge Matching Model in an IN718 Superalloy"; J. of Advanced Engineering Materials; 2018; 20 (Year: 2018).*

Fayed E., et al.; "Influence of Homogenization and Solution Treatments Time on the Microstructure and Hardness of Inconel 718 Fabricated by Laser Powder Bed Fusion Process"; Materials, 13, 2574 (Year: 2020).*

Deng D., et al.; "Microstructure and mechanical properties of Inconel 717 produced by selective laser melting: Sample orientation dependence and effects of post heat treaments", J. of Materials Science & Engineering, 713, 294-306 (Year: 2018).*

Vikram R.J., et al.; "Effect of heat treatment on the modification of microstructure of selective laser melted (SLM) IN718 and its consequences on mechanical behavior", J. of Materials Research (Year: 2020).*

Zhang D.; "Effect of standard heat treatment on the microstructure and mechanical properties of selective laser melting manufactured Inconel 718 superalloy;" J. of Materials Science and Engineering, 644, 2015, p. 32-40 (Year: 2015).*

202110235894.2, Nov. 15, 2021, Chinese First Office Action.
202110235894.2, Dec. 28, 2021, Second Chinese Office Action.
202110235894.2, Jan. 30, 2022, Chinese Notice of Allowance.

* cited by examiner

NICKEL-BASED SUPERALLOY FORMED BY SELECTIVE LASER MELTING AND PREPARATION METHOD THEREOF

CROSS REFERENCE TO RELATED APPLICATION

This patent application claims the benefit and priority of Chinese Patent Application No. 202110235894.2, entitled "Nickel-based superalloy formed by selective laser melting and a preparation method thereof" filed on Mar. 3, 2021, the disclosure of which is incorporated by reference herein in its entirety as part of the present application.

TECHNICAL FIELD

The disclosure relates to the technical field of an additive manufacturing from metal powder, in particular to a nickel-based superalloy formed by selective laser melting and a preparation method thereof.

BACKGROUND ART

Nickel-based superalloys can withstand high stress at a temperature above 600° C., and exhibit good oxidation and corrosion resistance, excellent mechanical properties, and good cold- and hot-working performance. Therefore, they are widely used in hot-end components such as aviation and aerospace engines, and ground gas turbines, and are irreplaceable key structural materials for modern national economy and national defense construction. Among them, IN718® alloy (i.e., Inconel 718®) is the most widely used superalloy in the world, accounting for not less than 35% of the total superalloy. It is widely used in hot-end components in medium-temperature service such as casings, fasteners and transmission components of aero-engines.

At present, 3D printing technology is a common process for preparing nickel-based superalloys. Although samples with high density, good forming quality, fine structure, and few or no metallurgical defects can be obtained by adjusting the forming parameters, a highly anisotropic columnar grain structure rather than all the equiaxed grain structure is easily produced in the nickel-based superalloy due to high temperature gradient and high cooling rate generated during the process, resulting in anisotropic mechanical properties of the alloy, and thereby seriously and adversely affecting the service life of nickel-based superalloys. Therefore, it is necessary to provide a method for preparing the nickel-based superalloys which is able to achieve refined grains and improved mechanical properties.

SUMMARY

An object of the present disclosure is to provide a nickel-based superalloy formed by selective laser melting and a preparation method thereof. The method according to the present disclosure could promote the formation of equiaxed grains, thereby improving mechanical properties of the nickel-based superalloy.

In order to achieve the above object, the present disclosure provides the following technical solutions.

Provided is a method for preparing a nickel-based superalloy formed by selective laser melting, comprising steps of
(1) ball milling and drying a nickel-based superalloy powder and a grain refiner in sequence to obtain a mixed powder, the nickel-based superalloy powder being an IN718® alloy powder, and the grain refiner being a CrFeNb alloy powder; and
(2) subjecting the mixed powder obtained in step (1) to a selective laser melting to obtain the nickel-based superalloy.

In some embodiments, in step (1), the nickel-based superalloy powder comprises (in mass percent) 18-19% of Fe, 52-53% of Ni, 19-20% of Cr, 3.0-3.5% of Mo, 0.2-0.3% of Al, 0.7-0.8% of Ti, 5.4-5.6% of Nb, 0.2-0.3% of Co, 0.01-0.02% of C, 0.04-0.05% of Mn, 0.1-0.2% of Si, 0.02-0.03% of Cu, not more than 0.0015% of S, and not more than 0.005% of B.

In some embodiments, in step (1), the nickel-based superalloy powder has a particle size of not larger than 53 μm, an average particle size of 20-25 μm, an oxygen content of 300-310 ppm, an apparent density of 4.30-4.40 g/cm$^3$, and a tap density of 5.00-5.10 g/cm$^3$.

In some embodiments, the CrFeNb alloy powder in step (1) comprises (in mass percent) 24-28% of Cr, 25-30% of Fe, and 45-50% of Nb.

In some embodiments, in step (1), the CrFeNb alloy powder has a particle size of not larger than 25 μm, and a theoretical density of 8.0-8.5 g/cm$^3$.

In some embodiments, the grain refiner in the mixed powder in step (1) accounts for 2 wt. %-4 wt. %.

In some embodiments, the drying in step (1) is performed at a temperature of 60-80° C. for 12-24 h.

In some embodiments, the selective laser melting in step (2) is performed under conditions: a laser power of 200-250 W, a scanning speed of 667-833 mm/s, and a layer thickness of 40-60 μm, a hatch distance of 50-90 μm, and a laser spot diameter of 75 μm.

In some embodiments, the selective laser melting in step (2) is performed in a protective atmosphere, and the protective atmosphere is provided by high-purity argon.

The present disclosure further provides the nickel-based superalloy prepared by the method as described in the above technical solutions.

The present disclosure provides a method for preparing a nickel-based superalloy formed by selective laser melting, comprising steps of (1) ball milling and drying a nickel-based superalloy powder and a grain refiner in sequence to obtain a mixed powder, the nickel-based superalloy powder being an IN718® alloy powder, and the grain refiner being a CrFeNb alloy powder; and (2) subjecting the mixed powder obtained in step (1) to a selective laser melting to obtain the nickel-based superalloy. In the present disclosure, the CrFeNb alloy powder is used as the grain refiner, and its element composition is within the composition range of a nickel-based superalloy powder and no impurity elements are introduced, thereby ensuring that the prepared nickel-based superalloy has the same element composition with the original alloy. Due to the addition of the CrFeNb alloy powder, the grain size in the nickel-based superalloy is refined during the selective laser melting, such that the anisotropic columnar grain structure in the alloy could be transformed to equiaxed grain structure, thereby improving mechanical properties of the alloy. The results of the examples show that: the nickel-based superalloy prepared in the present disclosure exhibits a yield strength of not less than 710 MPa at room temperature, a tensile strength of not less than 1010 MPa, an elongation of not less than 19%, and a hardness of not less than 330 HV; after the heat treatment, the nickel-based superalloy exhibits a yield strength of not less than 1400 MPa, a tensile strength of not less than 1100 MPa, an elongation of not less than 5.09%, and a hardness of not less than 530 HV.

DETAILED DESCRIPTION OF THE EMBODIMENTS

Figure 1:
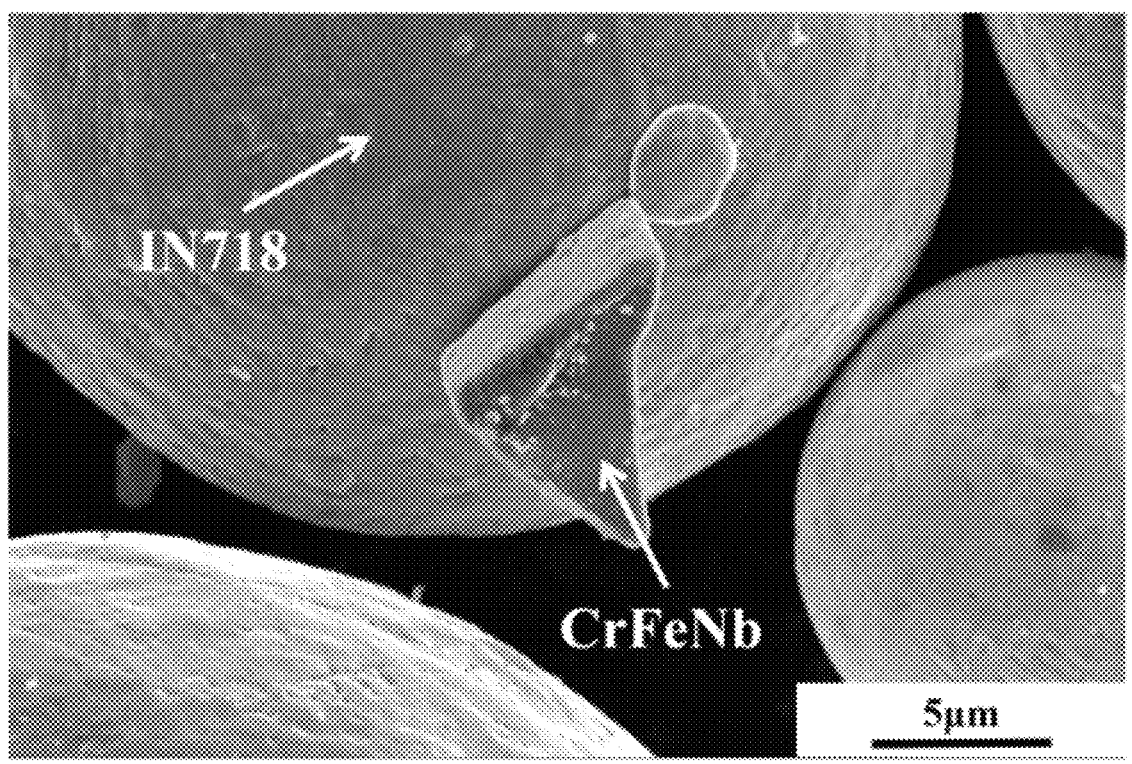
FIG. 1 is the scanning electron microscopy image of the mixed powder prepared in step (1) of Example 1 of the present disclosure.

The present disclosure provides a method for preparing a nickel-based superalloy formed by selective laser melting, comprising steps of
  (1) ball milling and drying a nickel-based superalloy powder and a grain refiner in sequence to obtain a mixed powder, the nickel-based superalloy powder being an IN718® alloy powder, and the grain refiner being a CrFeNb alloy powder; and
  (2) subjecting the mixed powder obtained in step (1) to a selective laser melting, to obtain the nickel-based superalloy.

In the present disclosure, the nickel-based superalloy powder and the grain refiner are ball milled and dried in sequence, to obtain a mixed powder.

In the present disclosure, the nickel-based superalloy powder is an IN718® alloy powder. In some embodiments, the nickel-based superalloy powder comprises, in percentages by mass, 18-19% of Fe, 52-53% of Ni, 19-20% of Cr, 3.0-3.5% of Mo, 0.2-0.3% of Al, 0.7-0.8% of Ti, 5.4-5.6% of Nb, 0.2-0.3% of Co, 0.01-0.02% of C, 0.04-0.05% of Mn, 0.1-0.2% of Si, 0.02-0.03% of Cu, not more than 0.0015% of S, and not more than 0.005% of B. Preferably, the nickel-based superalloy powder contains 18.63% Fe, 52.1448% Ni, 19.14% Cr, 3.13% Mo, 0.23% Al, 0.76% Ti, 5.41% Nb, 0.28% Co, 0.0191% C, 0.044% Mn, 0.18% Si, 0.028% Cu, 0.0011% S, and 0.003% B. In the present disclosure, there is no special limitation on the specific source of the nickel-based superalloy powder, and any commercially available product well known to those skilled in the art may be used.

In some embodiments, the nickel-based superalloy powder has a particle size of not larger than 53 μm, and preferably not larger than 50 μm. In some embodiments, the nickel-based superalloy powder has an average particle size of 20-25 μm, and preferably 21-24 μm. In some embodiments, the nickel-based superalloy powder has an oxygen content of 300-310 ppm, and preferably 300 ppm. In some embodiments, the nickel-based superalloy powder has an apparent density of 4.30-4.40 $g/cm^3$, and preferably 4.35 $g/cm^3$. In some embodiments, the nickel-based superalloy powder has a tap density of 5.00-5.10 $g/cm^3$, and preferably 5.05 $g/cm^3$. In the present disclosure, the nickel-based superalloy powder is used as raw material, and subjected to the selective laser melting to prepare the nickel-based superalloy with high performance.

In the present disclosure, the grain refiner is a CrFeNb alloy powder. In some embodiments, the CrFeNb alloy powder comprises (in mass percent) Cr (24-28%), Fe (25-30%), and Nb (45-50%). Preferably, the CrFeNb alloy powder consists of 25.9% Cr, 27.8% Fe, and 46.3% Nb. In some embodiments, the CrFeNb alloy powder has a particle size of not larger than 25 μm, and preferably not larger than 20 μm. In some embodiments, the CrFeNb alloy powder has a theoretical density of 8.0-8.5 $g/cm^3$, and preferably 8.2-8.3 $g/cm^3$. In the present disclosure, the CrFeNb alloy powder is used as the grain refiner, and the anisotropic columnar grain structure in the alloy is transformed to equiaxed grain structure, thereby improving mechanical properties of the alloy. Meanwhile, the element composition of the CrFeNb alloy powder is within the composition range of a nickel-based superalloy powder and no impurity elements are introduced, thereby ensuring that the prepared nickel-based superalloy has the same element composition with the original alloy.

In some embodiments, the CrFeNb alloy powder is prepared by a process comprising steps of
  1) melting a Cr source, an Fe source, and an Nb source by using a vacuum arc-melting furnace, to obtain a CrFeNb alloy ingot; and
  2) subjecting the CrFeNb alloy ingot obtained in step 1) to a hammer milling, a grinding, and a sieving in sequence, to obtain the CrFeNb alloy powder.

In some embodiments of the present disclosure, the Cr source, the Fe source, and the Nb source are melted by using a vacuum arc-melting furnace, to obtain a CrFeNb alloy ingot.

In some embodiments of the present disclosure, the Cr source, the Fe source, and the Nb source are elementary substances Cr, Fe, and Nb, respectively. In the present disclosure, there is no special limitation on the specific sources of the Cr source, the Fe source, and the Nb source, and commercially available products well known to those skilled in the art may be used.

In some embodiments of the present disclosure, the melting is performed at a stirring current of 0-50 A, and preferably 10-40 A. In some embodiments, the melting is performed at a melting current of 500-600 A, and preferably 520-580 A. In the present disclosure, through the vacuum arc melting, the components are mixed to be uniform.

In some embodiments of the present disclosure, after the CrFeNb alloy ingot is obtained, the CrFeNb alloy ingot is subjected to a hammer milling, a grinding, and a sieving in sequence, to obtain a CrFeNb alloy powder.

In the present disclosure, there is no specific limitation on the specific process for the hammer milling and the grinding, any operations for the hammer milling and the grinding well known to those skilled in the art may be used.

In some embodiments of the present disclosure, the sieving is performed by passing through a 600-mesh sieve. In the present disclosure, by passing the ground powder through a 600-mesh sieve, it can be ensured that the grain refiner has a particle size of not larger than 25 μm.

In some embodiments, the grain refiner in the mixed powder accounts for 2 wt. %-4 wt. %, and preferably 3 wt. %. In the present disclosure, the grain size in the nickel-based superalloy could be refined by the addition of the grain refiner, such that the anisotropic columnar grain structure in the alloy is transformed to equiaxed grain structure, thereby improving mechanical properties of the alloy.

In some embodiments of the present disclosure, a mass ratio of balls to material ranges from 1:1 to 3:1, and preferably 2:1. In some embodiments, the ball milling is performed at a rotation speed of 100-300 r/min, and preferably 200 r/min. In some embodiments, the ball milling is performed for 3-5 hours, and preferably 4 hours. In the present disclosure, the nickel-based superalloy powder and the grain refiner are mixed thoroughly by ball milling. In some embodiments, the ball milling is a wet ball milling. In some embodiments, a medium for the wet ball milling is alcohol (analytical reagent).

In some embodiments of the present disclosure, the drying is performed at a temperature of 60-80° C., and preferably 70° C. In some embodiments, the drying is performed for 12-24 h, and preferably 18 h. In the present disclosure, the ball milling medium and moisture in the mixed powder could be removed by drying.

In some embodiments of the present disclosure, the ball milling is performed in a planetary ball mill. In some embodiments, the drying is performed in an oven. In the present disclosure, there is no special limitation on the specific models and sources of the planetary ball mill and the oven, and instruments and equipment well known to those skilled in the art may be used.

In the present disclosure, after the mixed powder is obtained, the mixed powder is subjected to a selective laser melting, to obtain the nickel-based superalloy.

In some embodiments of the present disclosure, the selective laser melting is performed at a laser power of 200-250 W, and preferably 220-230 W. In some embodiments, the selective laser melting is performed at a scanning speed of 667-833 mm/s, and preferably 700-800 mm/s. In some embodiments, the selective laser melting is performed with a layer thickness of 40-60 μm, and preferably 50 μm. In some embodiments, the selective laser melting is performed with a hatch distance of 50-90 μm, and preferably 60-80 μm. In some embodiments, the selective laser melting is performed with a laser spot diameter of 75 μm. In some embodiments, a laser scanning is performed by a standard alternating X/Y raster scanning strategy. In some embodiments, the scanning strategy is characterized by bidirectional hatches of a layer "n" performed in Y-axis whilst the next layer "n+1" turned 90°. In the present disclosure, the nickel-based superalloy is prepared by selective laser melting, and the process parameters in the 3D printing could be optimized to further improve mechanical properties of the alloy.

In some embodiments of the present disclosure, the substrate used in the selective laser melting is 304 stainless steel. In some embodiments, the substrate is preheated at a temperature of 100-120° C., and preferably 110° C.

In some embodiments of the present disclosure, the selective laser melting is performed in a protective atmosphere. In some embodiments, the protective atmosphere is provided by high-purity argon. In some embodiments, the high-purity argon has a purity of not lower than 99.99 wt. %. In some embodiments, the oxygen content in the protective atmosphere is not more than 500 ppm, and preferably not more than 400 ppm. In the present disclosure, 3D printing is performed in a protective atmosphere, to prevent oxidation reaction(s) between the mixed powder and oxygen in the air.

In some embodiments, after the nickel-based superalloy is obtained, the nickel-based superalloy is separated from the substrate by wire electrical discharge machining. In the present disclosure, there is no special limitation on specific process(es) for wire electrical discharge machining, and operations well known to those skilled in the art may be used.

In some embodiments, after the nickel-based superalloy is obtained, the nickel-based superalloy is further subjected to a heat treatment. In some embodiments, the heat treatment is performed by a procedure comprising heating the nickel-based superalloy to a temperature of 1050-1200° C. and maintaining at the temperature for 1-2 hours, cooling in a furnace to a temperature of 950-1000° C. and maintaining at the temperature for 1-1.5 hours, and air-cooling to a temperature of 700-750° C. and maintaining at the temperature for 6-10 h; cooling to a temperature of 600-650° C. at a rate of 50-60° C./h and maintaining the temperature for 6-10 h, and cooling in the furnace to room temperature, to obtain a heat-treated nickel-based superalloy.

In the present disclosure, the mechanical properties of the nickel-based superalloy are further improved through the heat treatment.

The method according to the present disclosure is simple, and mature in the production process, and could achieve high production efficiency due to adopting the selective laser melting. Also, it is suitable for process production, and low in production cost.

The present disclosure also provides the nickel-based superalloy prepared by the method as described in the above technical solutions. The nickel-based superalloy prepared in the present disclosure exhibits excellent mechanical properties without introducing other impurity elements, and could be applied to fields such as aviation and aerospace engines, ground gas turbines and the like.

The technical solutions of the present disclosure will be clearly and completely described below in conjunction with examples of the present disclosure. Obviously, the described examples are only part, but not all of the examples of the present disclosure. Based on the examples of the present disclosure, all other examples obtained by those of ordinary skill in the art without creative efforts shall fall within the scope of the present disclosure.

Example 1

The nickel-based superalloy powder was IN718® alloy powder. The nickel-based superalloy powder consisted of, in percentages by mass, 18.63% of Fe, 52.1448% of Ni, 19.14% of Cr, 3.13% of Mo, 0.23% of Al, 0.76% of Ti, 5.41% of Nb, 0.28% of Co, 0.0191% of C, 0.044% of Mn, 0.18% of Si, 0.028% of Cu, 0.0011% of S, and 0.003% of B.

The nickel-based superalloy powder had a particle size of not larger than 53 μm, an average particle size of 21.5 μm, an oxygen content of 302 ppm, an apparent density of 4.38 g/cm$^3$, and a tap density of 5.08 g/cm$^3$.

The grain refiner was CrFeNb alloy powder. The CrFeNb alloy powder consisted of, in percentages by mass, 25.9% of Cr, 27.8% of Fe, and 46.3% of Nb. The CrFeNb alloy powder had a particle size of not larger than 25 μm, and a theoretical density of 8.2 g/cm$^3$.

A nickel-based superalloy was prepared by a method consisting of the following steps:

(1) The nickel-based superalloy powder and the grain refiner were placed into a ball milling tank of a planetary ball mill. Alcohol (analytical reagent) was then poured thereto to submerge the powder. The resulting mixture was ball milled with a mass ratio of balls to material of 1:1, and a rotation speed of 200 r/min for 4 h. The ball-milled mixture was put into an oven, and dried at 80° C. for 12 h, obtaining a mixed powder. The grain refiner in the mixed powder accounted for 2 wt. %.

(2) According to the characteristics of nickel-based superalloy, a three-dimensional solid model was established in the computer, saved as a file in STL format, and imported into the construction software of selective laser melting equipment. A layering processing was then performed. The substrate (304 stainless steel) was preheated to 110° C., and high-purity argon gas with a purity of 99.99 wt. % was introduced such that the oxygen content in the atmosphere was not larger than 500 ppm. Under conditions: a laser power of 200 W, a scanning speed of 667 mm/s, a layer thickness of 40 μm, a hatch distance of 75 μm, and a laser spot diameter of 75 μm, a laser volume energy density of 100 J/mm$^3$, the laser scanning being performed by a standard alternating X/Y raster scanning strategy, and the scanning strategy being characterized by bidirectional hatches of a layer "n" performed in Y-axis whilst the next layer "n+1" turned 90°, the mixed powder obtained in step (1) was subjected to a selective laser melting, obtaining the nickel-based superalloy. Finally the nickel-based superalloy was separated from the substrate by electrical discharge machining.

The nickel-based superalloy prepared in Example 1 exhibited a yield strength of 710 MPa at room temperature, a tensile strength of 1010 MPa, an elongation of 24.05%, and a hardness of 334 HV.

FIG. 1 is a scanning electron microscopy image of the mixed powder prepared in step (1) in Example 1 of the present disclosure. It can be seen from FIG. 1 that the nickel-based superalloy powder particles and the CrFeNb alloy powder particles in the mixed powder were evenly mixed.

Figure 2:
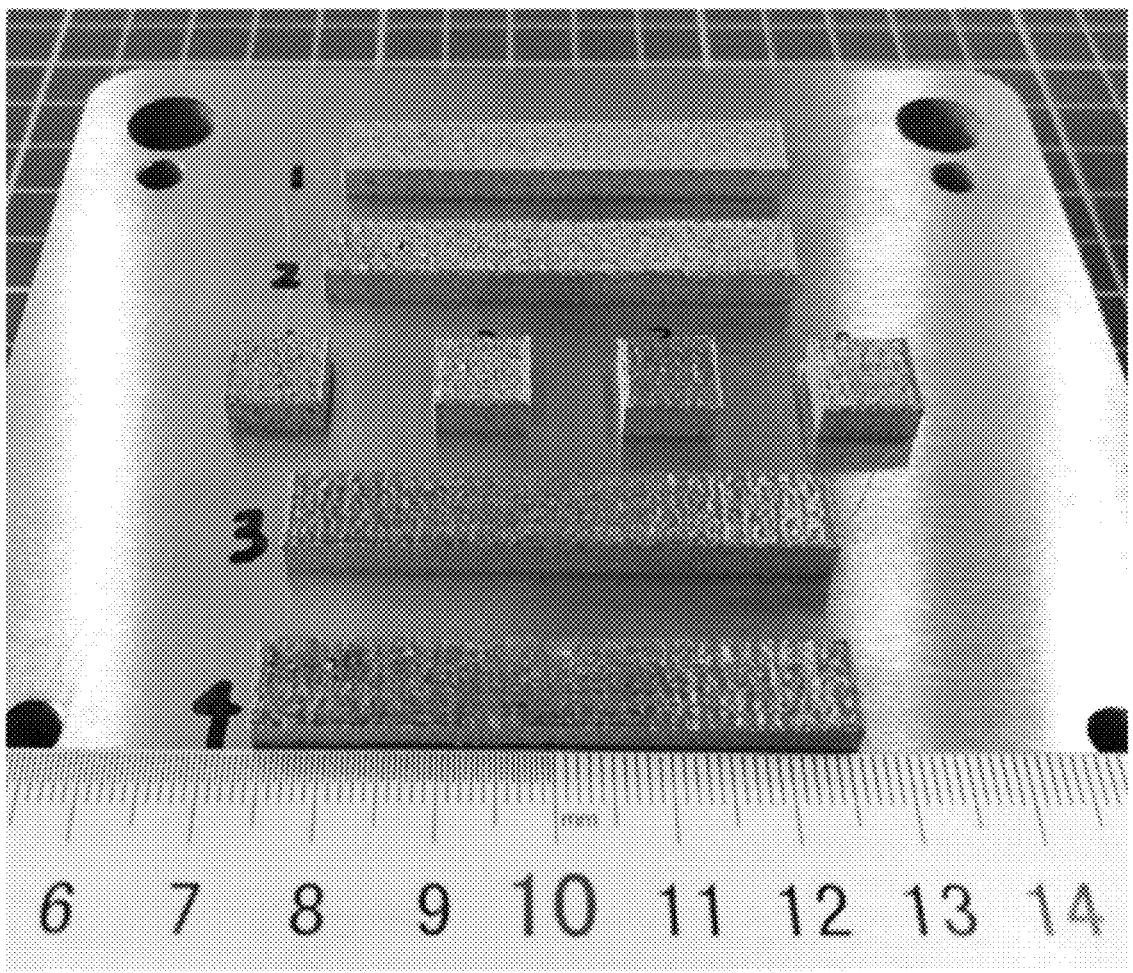
FIG. 2 is a photograph of the nickel-based superalloy sample prepared in Example 1 of the present disclosure.

FIG. 2 is a photograph of the nickel-based superalloy sample prepared in Example 1 of the present disclosure.

Figure 3:
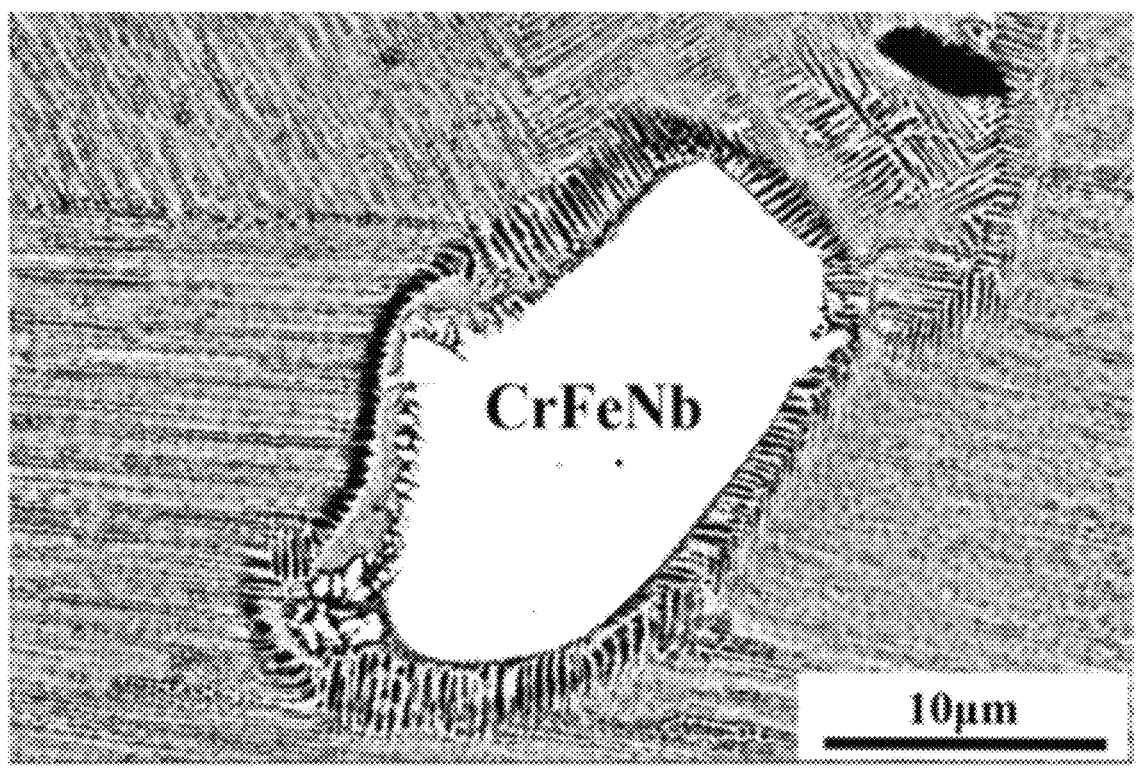
FIG. 3 shows the microstructure of the nickel-based superalloy prepared in Example 1 of the present disclosure.

FIG. 3 shows the microstructure of the nickel-based superalloy prepared in Example 1 of the present disclosure. It can be seen from FIG. 3 that the anisotropic columnar grain structure in the nickel-based superalloy could be changed by the addition of the CrFeNb alloy powder.

Example 2

The nickel-based superalloy powder and grain refiner used were the same as those in Example 1.

A nickel-based superalloy was prepared by a method consisting of the following steps:

(1) The nickel-based superalloy powder and the grain refiner were placed into a ball milling tank of a planetary ball mill. Alcohol (analytical reagent) was then poured thereto to submerge the powder. The resulting mixture was ball milled with a mass ratio of balls to material of 3:1, and a rotation speed of 300 r/min for 3 h. The ball-milled mixture was put into an oven, and dried at 60° C. for 24 h, obtaining a mixed powder. The grain refiner in the mixed powder accounted for 4 wt. %.

(2) According to the characteristics of nickel-based superalloy, a three-dimensional solid model was established in the computer, saved as a file in STL format, and imported into the construction software of selective laser melting equipment. A layering processing was then performed. The substrate (304 stainless steel) was preheated to 110° C., and high-purity argon gas with a purity of 99.99 wt. % was introduced such that the oxygen content in the atmosphere was not larger than 500 ppm. Under conditions: a laser power of 250 W, a scanning speed of 833 mm/s, a layer thickness of 40 μm, a hatch distance of 75 μm, and a laser spot diameter of 75 μm, a laser volume energy density of 100 J/mm$^3$, the laser scanning being performed by a standard alternating X/Y raster scanning strategy, and the scanning strategy being characterized by bidirectional hatches of a layer "n" performed in Y-axis whilst the next layer "n+1" turned 90°, the mixed powder obtained in step (1) was subjected to a selective laser melting, obtaining the nickel-based superalloy. Finally, the nickel-based superalloy was separated from the substrate by electrical discharge machining.

The nickel-based superalloy prepared in Example 2 exhibited a yield strength of 802 MPa at room temperature, a tensile strength of 1119 MPa, an elongation of 19.42%, and a hardness of 365 HV.

The nickel-based superalloy obtained in Example 2 was subjected to a heat treatment, and the heat treatment was performed as follows: the nickel-based superalloy was heated to 1100° C. and maintained at the temperature for 1.5 h; then cooled in the furnace to 980° C. and maintained at the temperature for 1 h; then air-cooled to 720° C. and maintained at the temperature for 8 h; then cooled to 620° C. at a rate of 56° C./h, and maintained at the temperature for 8 h; finally cooled in the furnace to room temperature, obtaining a heat-treated nickel-based superalloy. The heat-treated nickel-based superalloy exhibited a yield strength of 1426 MPa, a tensile strength of 1199 MPa, an elongation of 5.09%, and a hardness of 531 HV.

Figure 4:
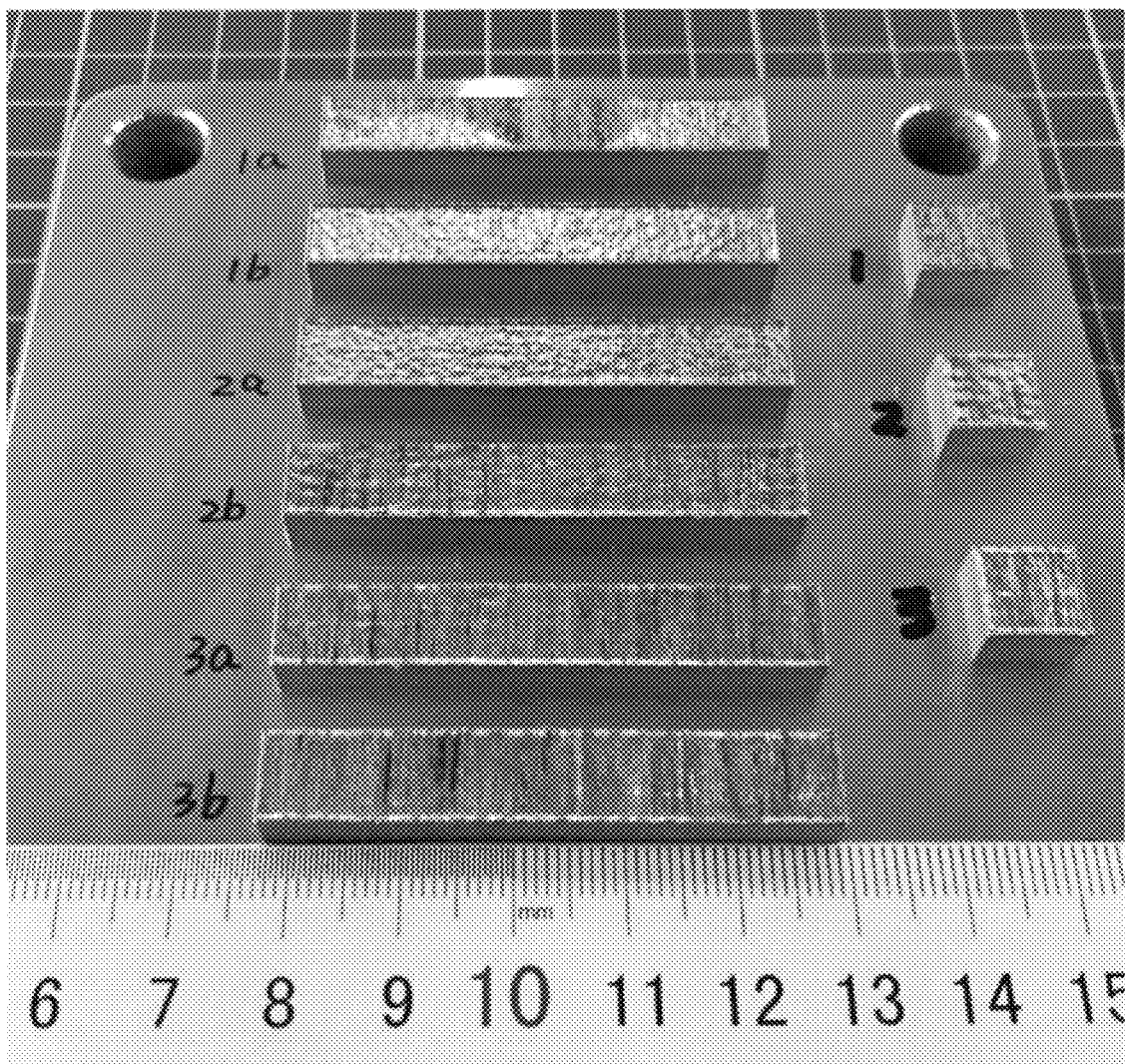
FIG. 4 is a photograph of the nickel-based superalloy sample prepared in Example 2 of the present disclosure.

FIG. 4 is a photograph of the nickel-based superalloy sample prepared in Example 2 of the present disclosure.

Comparative Example 1

The nickel-based superalloy powder used was the same as that in Example 1.

A nickel-based superalloy was prepared by a method consisted of the following steps:

(1) The nickel-based superalloy powder was placed into a ball milling tank of a planetary ball mill. Alcohol (analytical reagent) was then poured thereto to submerge the powder. The resulting mixture was ball milled with a mass ratio of balls to material of 1:1, and a rotation speed of 200 r/min for 4 h. The ball-milled mixture was put into an oven, and dried at 80° C. for 12 h, obtaining a ball-milled powder I.

(2) According to the characteristics of nickel-based superalloy, a three-dimensional solid model was established in the computer, saved as a file in STL format, and imported into the construction software of selective laser melting equipment. A layering processing was then performed. The substrate (304 stainless steel) was preheated to 110° C., and high-purity argon gas with a purity of 99.99 wt. % was introduced such that the oxygen content in the atmosphere was not larger than 500 ppm. Under conditions: a laser power of 250 W, a scanning speed of 833 mm/s, a layer thickness of 40 μm, a hatch distance of 75 μm, and a laser spot diameter of 75 μm, a laser volume energy density of 100 J/mm$^3$, the laser scanning being performed by a standard alternating X/Y raster scanning strategy, and the scanning strategy being characterized by bidirectional hatches of a layer "n" performed in Y-axis whilst the next layer "n+1" turned 90°, the ball-milled powder I obtained in step (1) was subjected to a selective laser melting, obtaining the nickel-based superalloy. Finally, the nickel-based superalloy was separated from the substrate by electrical discharge machining.

The nickel-based superalloy prepared in Comparative Example 1 exhibited a yield strength of 679 MPa at room temperature, a tensile strength of 964 MPa, an elongation of 28.83%, and a hardness of 315 HV.

The nickel-based superalloy obtained in Comparative Example 1 was subjected to a heat treatment. The heat treatment was performed as follows: the nickel-based superalloy was heated to 1100° C. and maintained at the temperature for 1.5 h; then cooled in the furnace to 980° C. and maintained at the temperature for 1 h; then air-cooled to 720° C. and maintained at the temperature for 8 h; then cooled to 620° C. at a rate of 56° C./h, and maintained at the temperature for 8 h; finally cooled in the furnace to room temperature, obtaining a heat-treated nickel-based superalloy. The heat-treated nickel-based superalloy exhibited a yield strength of 1130 MPa, a tensile strength of 1356 MPa, an elongation of 17.88%, and a hardness of 479.8 HV.

By comparing the mechanical properties between the nickel-based superalloys prepared in Example 1, Example 2 and Comparative Example 1, it can be seen that compared with Comparative Example 1, the yield strength of the nickel-based superalloy prepared in Example 1 is improved by 5%, the tensile strength thereof is improved by 5%, and the plasticity thereof is similar. Compared with Comparative Example 1, the yield strength of the nickel-based superalloy prepared in Example 2 is improved by 18%, the tensile strength thereof is improved by 16%, and the hardness thereof is improved by 16%. Compared with Comparative Example 1, the yield strength of the heat-treated nickel-based superalloy prepared in Example 2 is improved by 5%, the tensile strength thereof is improved by 6%, and the hardness thereof is improved by 11%.

Figure 5:
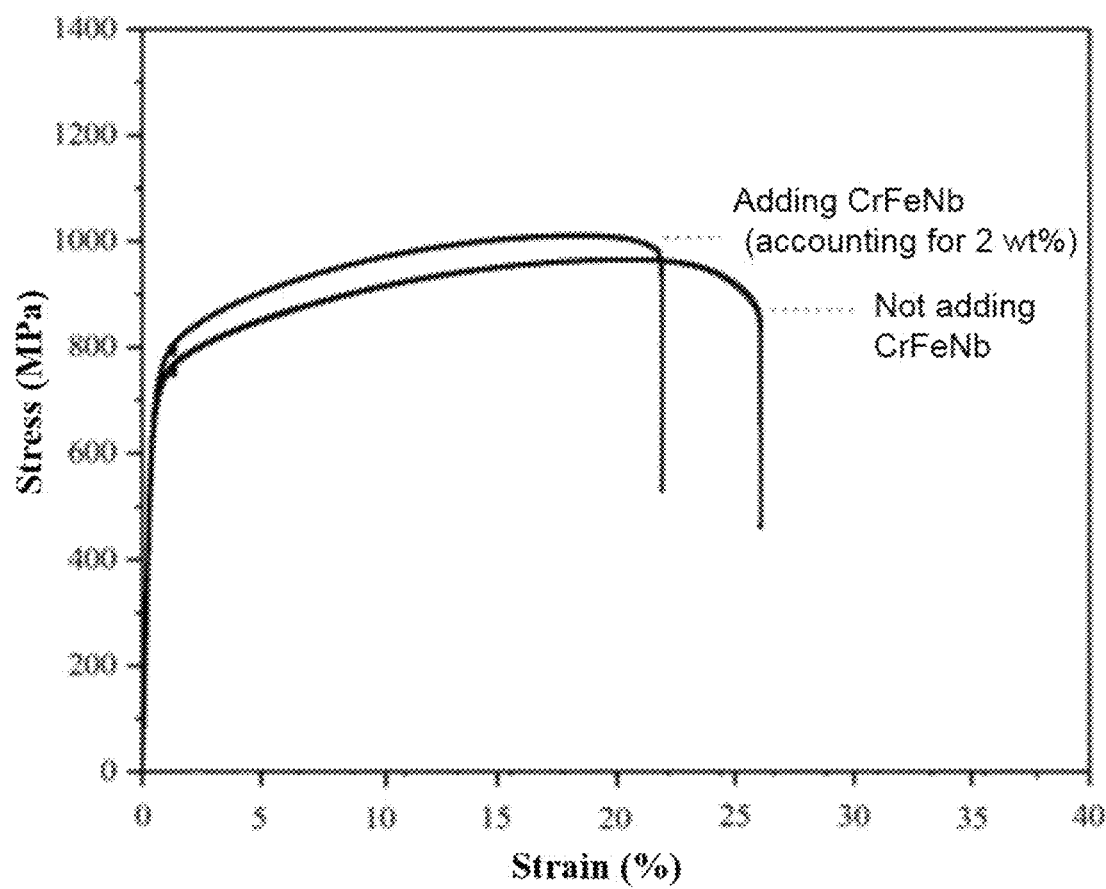
FIG. 5 shows tensile curves of the nickel-based superalloys prepared in Example 1 and Comparative Example 1 of the present disclosure at room temperature.

FIG. 5 shows tensile curves of the nickel-based superalloys prepared in Example 1 and Comparative Example 1 of the present disclosure at room temperature. It can be seen from FIG. 5 that the nickel-based superalloy prepared in the present disclosure exhibits a higher yield strength at room temperature, indicating that the crystal grains in the nickel-based superalloy could be refined by the addition of CrFeNb alloy such that the anisotropic columnar grain structure in the alloy could be transformed to equiaxed grain structure, thereby improving the mechanical properties of the alloy.

Figure 6:
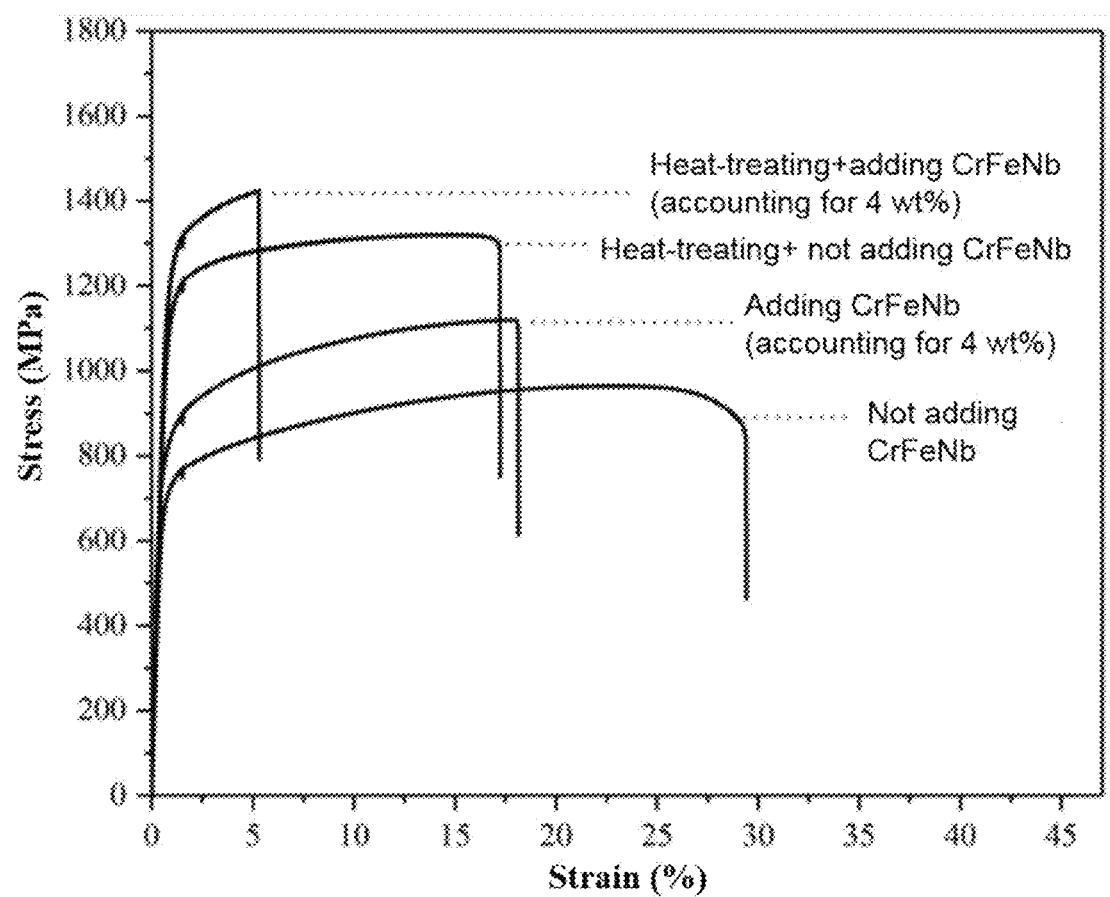
FIG. 6 shows tensile curves of the nickel-based superalloys and the heat-treated nickel-based superalloys prepared in Example 2 and Comparative Example 1 of the present disclosure at room temperature.

FIG. 6 shows tensile curves of the nickel-based superalloys and the heat-treated nickel-based superalloys prepared in Example 2 and Comparative Example 1 of the present disclosure at room temperature. It can be seen from FIG. 6 that the yield strength of the nickel-based superalloy prepared in the present disclosure is greatly improved through the heat treatment, indicating that the crystal grain in the nickel-based superalloy could be refined by the addition of the CrFeNb alloy powder such that the anisotropic columnar grain structure in the alloy could be transformed to equiaxed grain structure, thereby improving the mechanical properties of the alloy.

The above are only the preferred embodiments of the present disclosure. It should be pointed out that for those skilled in the art, without departing from the principles of the present disclosure, several improvements and modifications could be made. However, the improvements and modifications shall fall within the scope of the present disclosure.

What is claimed is:

1. A method for preparing a nickel-based superalloy formed by selective laser melting, comprising:
(1) ball milling and drying a nickel-based superalloy powder and a grain refiner in sequence to obtain a mixed powder,
the nickel-based superalloy powder comprising, percentages by mass, 18-19% of Fe, 52-53% of Ni, 19-20% of Cr, 3.0-3.5% of Mo, 0.2-0.3% of Al, 0.7-0.8% of Ti, 5.4-5.6% of Nb, 0.2-0.3% of Co, 0.01-0.02% of C, 0.04-0.05% of Mn, 0.1-0.2% of Si, 0.02-0.03% of Cu, not more than 0.0015% of S, and not more than 0.005% of B, and the grain refiner being a CrFeNb alloy powder; and
(2) selective laser melting the mixed powder obtained in act (1) to obtain the nickel-based superalloy,
wherein the CrFeNb alloy powder in act (1) comprises, in percentages by mass, 24-28% of Cr, 25-30% of Fe, and 45-50% of Nb;
the grain refiner in the mixed powder in act (1) accounts for 2 wt. %-4 wt. %;
the selective laser melting in act (2) is performed under conditions:
a laser power of 200-250 W, a scanning speed of 667-833 mm/s, and a layer thickness of 40-60 μm, a hatch distance of 50-90 μm, and a laser spot diameter of 75 μm; and
the method further comprises heating the nickel-based superalloy to a first temperature of 1050-1200° C. and maintaining at the first temperature for 1-2 hours, cooling in a furnace to a second temperature of 950-1000° C. and maintaining at the second temperature for 1-1.5 hours, and air-cooling to a third temperature of 700-750° C. and maintaining at the third temperature for 6-10 h; cooling to a fourth temperature of 600-650° C. at a rate of 50-60° C./h and maintaining at the fourth temperature for 6-10 h, and cooling in the furnace to room temperature.

2. The method as claimed in claim 1, wherein in act (1), the nickel-based superalloy powder has a particle size of not larger than 53 μm, an average particle size of 20-25 μm, an oxygen content of 300-310 ppm, an apparent density of 4.30-4.40 g/cm$^3$, and a tap density of 5.00-5.10 g/cm$^3$.

3. The method as claimed in claim 1, wherein in act (1), the CrFeNb alloy powder has a particle size of not larger than 25 μm, and a theoretical density of 8.0-8.5 g/cm$^3$.

4. The method as claimed in claim 1, wherein the drying in act (1) is performed at a temperature of 60-80° C. for 12-24 h.

5. The method as claimed in claim 1, wherein the selective laser melting in act (2) is performed in a protective argon atmosphere.

* * * * *